3,002,292
SIMULATED NOSE WHEEL STEERING SYSTEM
Charles L. Cohen, Hyattsville, Md., and Robert A. Atchison, Princeton, N.J., assignors to ACF Industries, Incorporated, New York, N.Y., a corporation of New Jersey
Filed Feb. 27, 1958, Ser. No. 717,933
16 Claims. (Cl. 35—12)

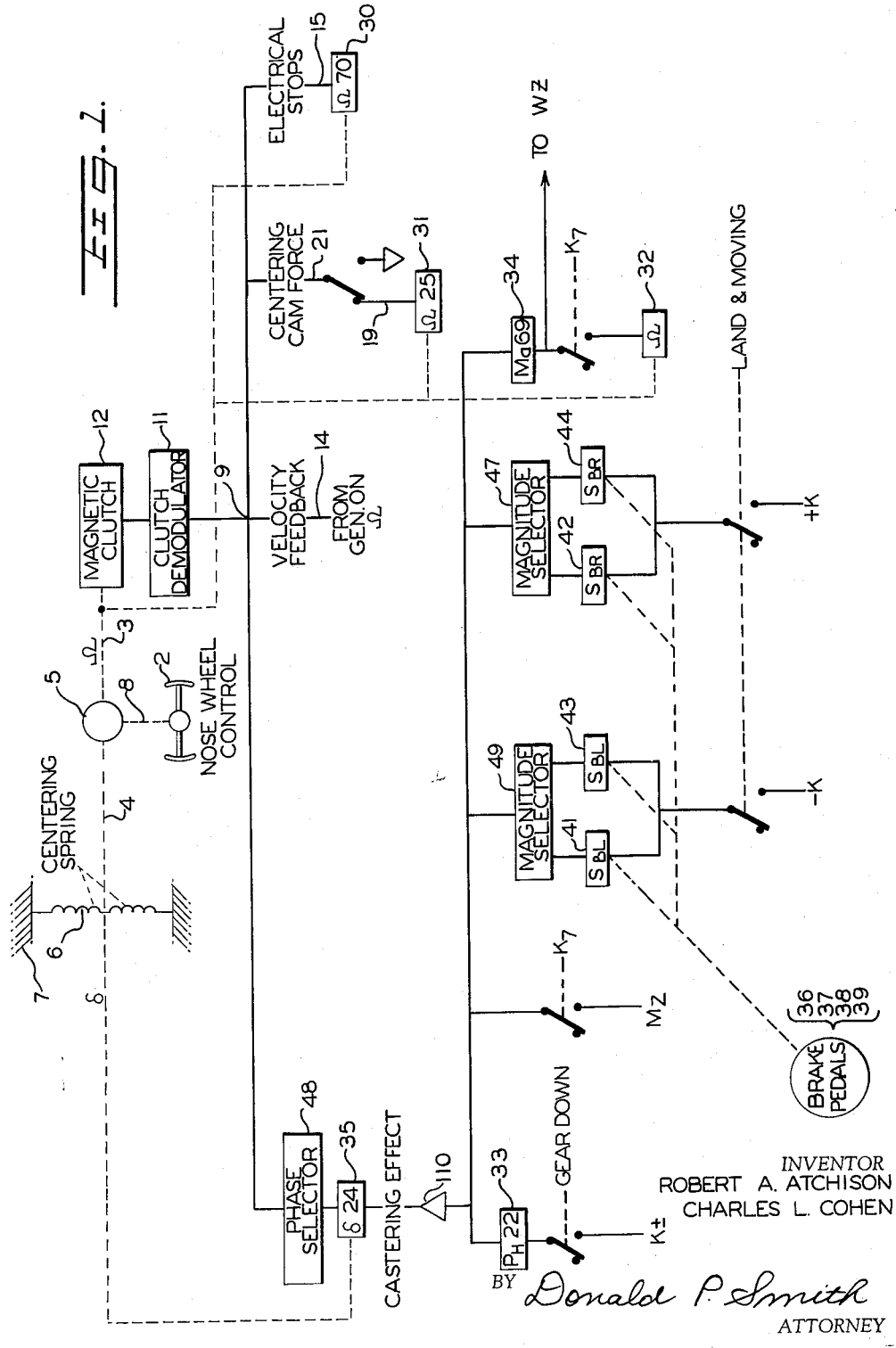

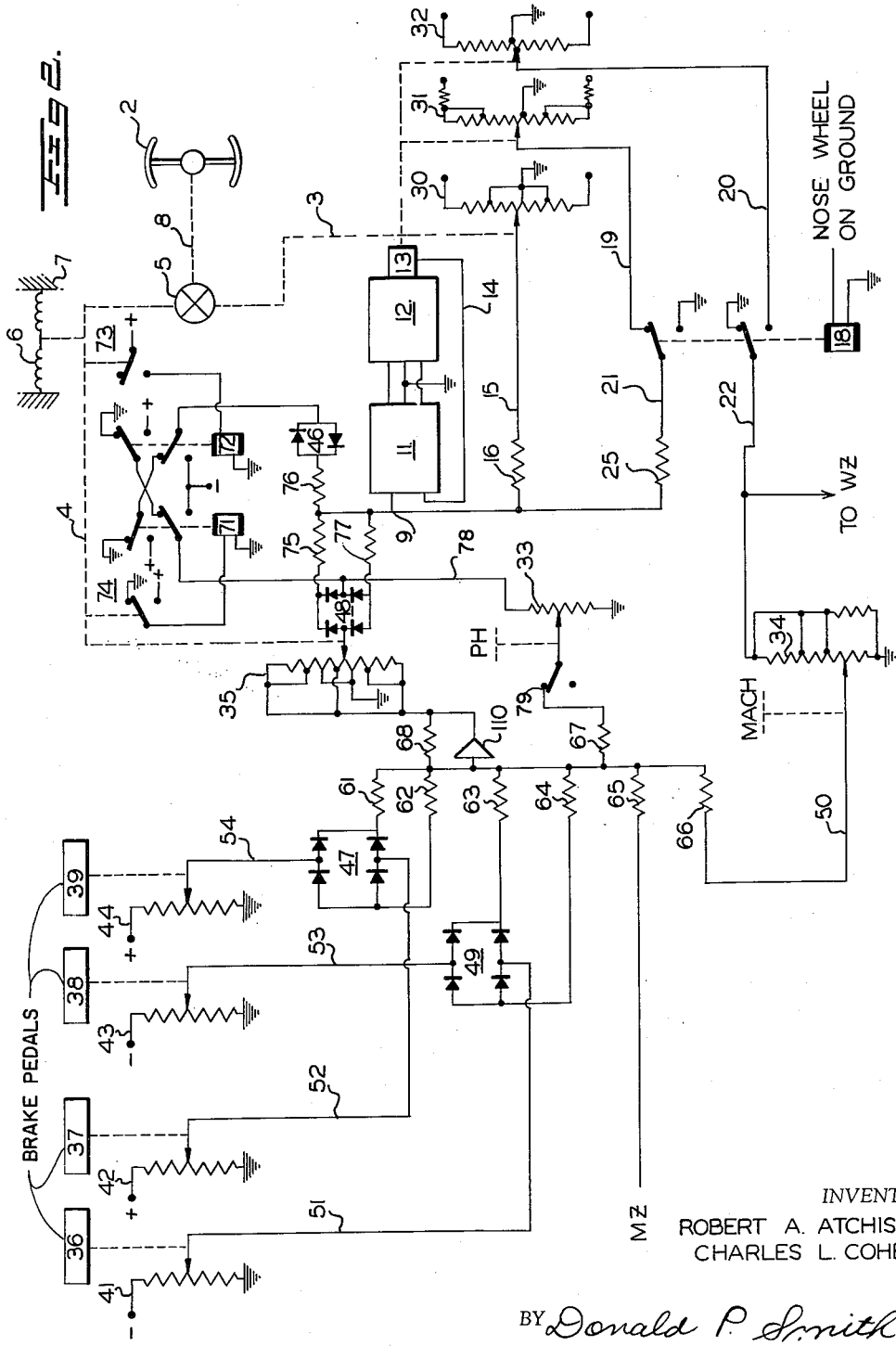

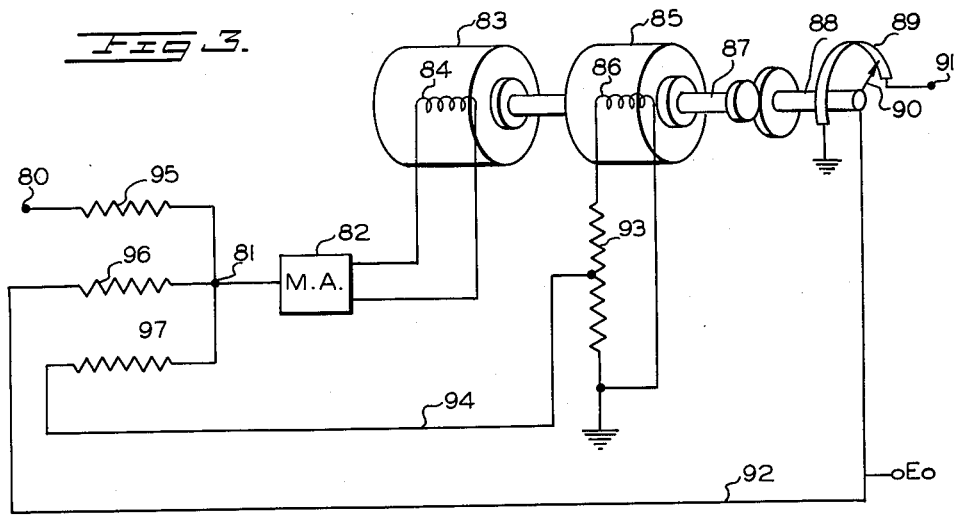
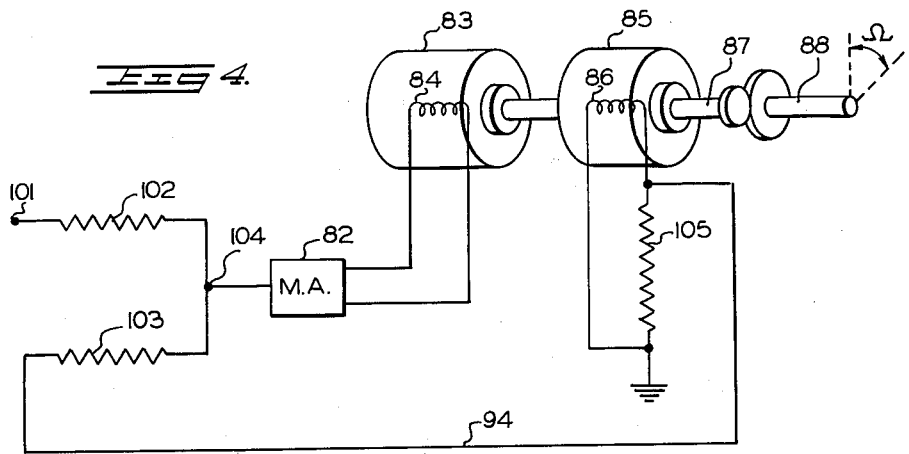
INVENTOR
ROBERT A. ATCHISON
CHARLES L. COHEN
BY Donald P. Smith
ATTORNEY

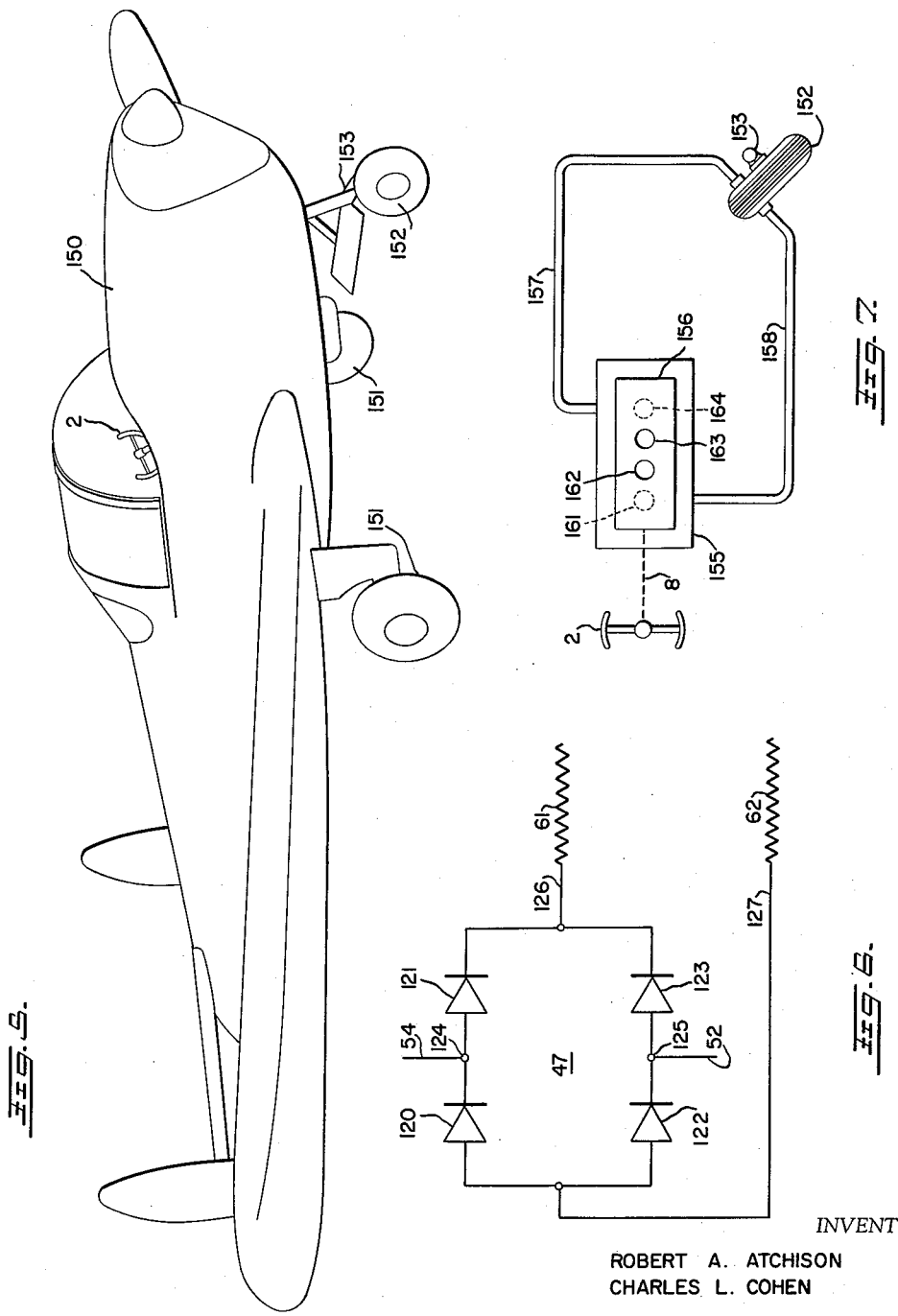

This invention relates to aircraft training apparatus, and more particularly to a grounded training apparatus for simulating to a student the effects of a nose wheel steering system during a simulated flight.

In a typical steering system in an actual aircraft, a steering valve is displaced by cables and linkages operated from the pilot's nose wheel steering wheel. The steering valve directs the flow of a hydraulic fluid to a pair of pressure cylinders on the steering unit at the nose wheel. When the nose steering unit turns, as a result of the valve displacement, a cable follow-up system moves the valve to stop the flow of fluid when the unit has been turned to a position equivalent to the steering wheel position. When the nose wheel lifts off the ground on take-off, a centering cam exerts a large force to center the nose wheel. When the aircraft turns pivotally due to the action of braking the two main wheels, or from turning moment forces developed from pressures on the aircraft surfaces, the nose wheel will castor, or pivot, to align itself with the path of the plane, turning the steering wheel to conform to the turned position. The amount of force necessary to be applied by the pilot to the steering wheel to change its position will vary with the forces of motion and friction acting upon the nose wheel. The resultant position of the nose wheel itself will affect the turning rate of the aircraft. It is to the simulation of these realistic aspects of a nose wheel system that this invention is directed.

The prior art methods of simulating the effects of a steering wheel system is to provide a simulated nose wheel steering wheel with a potentiometer connected thereto. When the steering wheel is turned a voltage is picked off which is proportional to the displacement thereof. This voltage is then sent to a computer which calculates the rate and direction of turning of the simulated aircraft when on the ground. This drives the rate of turn indicator which is visible to the student during simulated flight. This, however, is the simplest form of nose wheel simulation and does not cover the many aspects of nose wheel steering encountered in the actual aircraft as discussed, supra.

This invention is an improvement over the prior art flight simulators in that it simulates many of the actual effects previously ignored. Whereas prior flight simulators were concerned only with developing a voltage proportional to the displacement of the nose wheel steering wheel, this invention simulates the nose wheel position, the resultant steering wheel position during differential braking, the force feel at the steering wheel due to centering cam force and castoring effect during braking.

It is, therefore, the primary object of the invention to provide a system for simulating to a student the aspects of a nose wheel steering system for aircraft.

It is a further object of this invention to duplicate synthetically, the angular position of the nose wheel of an aircraft when taxiing and to impart to the simulated steering wheel those forces which would be imparted to an actual steering wheel in an aircraft.

It is a still further object of this invention to calculate and produce a voltage analog proportional to the turning rate which is developed on an actual aircraft due to the turning rate which is developed on an actual aircraft due to the operation of the nose wheel.

It is another object of this invention to provide in a synthetic manner the effects of pilot's and co-pilot's brakes, castoring restoring force, and centering cam restoring force upon the simulated steering wheel and upon the computed turning rate value. Other objects will appear as the description proceeds.

Referring now to the drawings which are hereby made a part of the specification, wherein:

FIG. 1 is a schematic block diagram of the simulated nose wheel steering system.

FIG. 2 is a schematic circuit diagram of the preferred embodiment of the invention.

FIG. 3 is a functional schematic diagram of a typical electro-mechanical position servo.

FIG. 4 is a functional schematic diagram of a typical electro-mechanical velocity servo.

FIG. 5 is a perspective view of an aircraft having a tricycle landing gear.

FIG. 6 is a schematic view of a magnitude selector.

FIG. 7 is a cutaway view of a typical hydraulic nose wheel system of an aircraft.

Summarily stated the simulated nose wheel steering system invention comprises a system for use as a training device comprising an aircraft type nose wheel steering wheel; a shaft representing the angular position of the nose wheel; a differential apparatus connected to the steering wheel and shaft for generating forces to modify the steering wheel position in accordance with forces applied directly to the steering wheel and forces analogous to braking, turning moment, castoring and centering which are present during the operation of a nose wheel system in an actual aircraft.

A general description of an aircraft's hydraulic nose wheel steering system will be helpful in understanding the invention. Referring now to FIG. 5 and FIG. 7, a typical aircraft 150 is shown as having a control member 2 useful inter alia to steer the vehicle and having three load bearing wheels 151 and 152 arranged in a triangle, with the leading wheel 152 pivotable with respect to the plane's longitudinal axis of symmetry on shaft 153. The steering wheel 2, controls through shaft 8 FIG. 7 the position of a plate 156 in respect to the hydraulic pressure container 155. In the position shown, the apertures 162 and 163 in the plate 156 are not aligned with the apertures 161 and 164 leading to the hydraulic conduits 157 and 158. It being understood that a centering spring (not shown) is provided to keep the plate 156 under mechanical pressure and centered until a superior opposing force by the pilot overcomes the spring force. Under this condition, no pressure is applied to pivot the nose wheel 152 and the only force to pivot the wheel are those due to straightening out or castoring forces which tend to align the wheel with the direction of movement of the front of the aircraft. This action normally occurs during differential braking or any other action such as lateral wind force which tends to turn the aircraft. When, however, the control member 2 is turned by the pilot, the plate 156 will move either to the right or to the left as there shown to partially or completely align one of the apertures in the plate with an end of the hydraulic tubing 161 or 164. Hydraulic pressure is transmitted to one or the other of the hydraulic lines 157 or 158, to apply a pressure to the wheel motor (not shown) to pivot the wheel about shaft 153.

Referring now to FIG. 1 and FIG. 2 which show a block and a schematic representation of the system, the steering wheel is shown as 2 and an input shaft 8 connects it to a mechanical differential 5. Also connected to the mechanical differential, as an input to the differential, is nose wheel position shaft 3 indicated by (Ω) and driven by a magnetic clutch 12. The difference or output shaft 4 is urged to a neutral position by centering spring 6 which is fastened to the stationary trainer frame 7. Reference characters 30, 31, 32, 33, 35, 41, 42, 43, 44 represent variable voltage sources. As there indicated, derived voltage proportioned to forces due to nose wheel position, 32, Mach 34, simulated brake pedal 36, 37, 38 and 39 positions, turning moment $M_z$, hydraulic pressure 33, difference 35, limit stops 30, centering cam force 31 and velocity feedback 14 are all fed to conductor 9. The conductor 9 is connected to the clutch demodulator 11 which is connected to the magnetic clutch 12. The output of the magnetic clutch turns the nose wheel position shaft 3. Clutch arrangements of the type which may be used are shown in Patent No. 2,758,484 issued to J. P. Keltner or Patent No. 2,752,800 issued to Raymond et al. The magnetic clutch 12 may be of any type employing two clutch units each having relative rotatable input and output members. The two units have their input members driven in opposite directions at a constant speed. The two output members are geared to the nose wheel position shaft which constitutes one input to the differential 5. In operation either one unit or the other is energized to apply the torque from one of two input members to the output member. The clutches may be either the eddy current or the magnetic fluid type, both of which are well known to the art. A polarity sensitive gate such as a diode pair is provided to pass energy of selected polarity to the proper clutch to provide torque in a predetermined direction.

The operation of the system described up to this point is as follows: The mechanical differential 5 receives position inputs from shafts 3 and 8 and drives output shaft 4 in accordance with the difference between the two inputs. Output shaft 4 is urged toward neutral or center position by spring 6 so that an input movement from shaft 3 will turn steering wheel 2 instead of driving shaft 4. If the motion of the steering wheel 2 is restrained by the trainee, output shaft 4 moves the wiper of a potentiometer 35 to pick off a portion of the amplifier 110 voltage in dependence upon the amount of deflection of shaft 4. This A.C. voltage is conducted to the demodulator 11 which provides a D.C. voltage to the magnetic clutch 12 to move the nose wheel position shaft 3. If the voltage output of potentiometer 35 is the only one fed back, it operates to turn shaft 3 to reduce the difference between itself and shaft 8 to zero whereby the output is zero.

FIG. 2 is a more detailed schematic presentation of the invention of FIG. 1. An electro-mechanical nose wheel position system is shown comprising a demodulator 11, a magnetic clutch 12, a tachometer generator 13, input shaft 3, having potentiometers 30, 31 and 32 mounted thereon. Conductors 15, 19, and 20 feed voltage proportional to the angular position of the nose wheel position shaft 3 back to the input 9 of the clutch demodulator 11 when the nose wheel on ground relay 18 is deenergized. The simulated steering wheel 2 is connected to the mechanical shaft 8 representing one input to the mechanical differential 5, the other input being from the nose wheel position shaft 3. The difference between the two mechanical inputs 3 and 8 is translated by the differential 5 into position information represented by mechanical shaft 4. Connected to the brake pedals 36, 37, 38 and 39 are the wipers of potentiometers 41, 42, 43 and 44 which pick off a voltage proportional to the brake pedal displacement under the control of the student pilot. These voltages are fed to the magnitude selectors 47 and 49 whose outputs are then fed through input impedances 61, 62, 63 and 64 to the summing amplifier 110. Voltage analogous to turning moment ($M_z$) which may be derived in a manner to be later described is fed through impedance 65; and castoring restoring force connected through conductor 50 and input impedance 66 are all summed to make up the control voltage to be applied to the clutch demodulator under certain flight circumstances. The mechanical shaft 4 has cam switches 73 and 74 mounted thereon to operate relays 71 and 72 when the difference shaft 4 is moved from its neutral position. A contact of relay 71 is connected to conductor 78 and thence to hydraulic pressure potentiometer 33 through "landing gear down" contacts 79 through input impedance 67 to the summing amplifier 110. The output of the summing amplifier 110 is connected to the extremities and to the center of the potentiometer 35 which has its wiper driven by the shaft 4. The wiper arm of the potentiometer makes up one of the two inputs to the phase selector 48.

FIGS. 3 and 4 show types of position and velocity servos which may be used to derive the various before described voltages such as Mach, turning rate $W_z$, turning moment $M_z$ and hydraulic pressure PH. In FIG. 3 motor amplifier 82 is connected to the three input impedances 95, 96 and 97. The output of the amplifier 82 is applied to winding 84 of motor 83. To the motor shaft is connected the generator 85 having generator output winding 86. Impedance 93 is connected between winding 86 and ground. The mechanical shaft 87 is geared down to drive output shaft 88 on which is mounted potentiometer 89 having terminal 91 and rotatable arm 90. Conductors 92 and 94 conduct the position voltage and the generator or tachometer voltages to the input impedances 96 and 97. Referring to FIG. 3 which is a functional schematic diagram of a typical electromechanical position servo it will be seen that the voltage occurring on conductor 92 will be representative of the angular position of shaft 88. The purpose of this device is to convert the input voltage 80 into a mechanical shaft position with sufficient torque to drive potentiometers or other devices as needed. The motor amplifier 82 is a high gain amplifier which develops the power required to drive the motor and its mechanical load. The potentiometer 89 may be of any construction convenient to have a contact arm driven along its length by the mechanical structure 88. One such potentiometer construction is that shown in Patent No. 2,543,228 issued February 27, 1951, to L. M. Burgess for "Variable Resistor Construction."

Assuming first that the shaft 88 is set at zero degrees rotation, the potentiometer arm 90 will be at the ground connection of potentiometer 89. Under such conditions there will be no voltage present on the electrical connector 92. Assume further that there is no input voltage at terminal 80. Neglecting voltage on connector 94 for the moment, summation point 81 will have a potential of zero volts and since connection 81 is the driving point of the motor amplifier 82, zero power will be fed to the motor and the shaft 88 will remain at rest. If the input voltage 80 becomes a positive phase 25 volts A.C. the voltage at 81 will tend to follow 80, power will be developed in the output of the motor amplifier and the motor will start to turn. As the motor 83 turns, wiper 90 of the potentiometer 89 will be turned up from ground, picking off a negative phase A.C. voltage of increasing magnitude since the voltage on connector 92 which is fed back from the potentiometer 89 is 180° out of phase with the input voltage at terminal 80. The summation of the two out of phase voltages through input impedances 95 and 96 will cancel each other out with a resultant voltage of zero at point 81. By limiting the value of the input voltages at point 80 to the voltage applied at point 91 the servo mechanism will be limited to the rotation equivalent to the number of angular degrees in potentiometer 89. If the input voltage at terminal 80 now decreases the voltage at 81 will tend to drop and the motor will turn in the opposite direction and the wiper will be driven down and again seek to restore equilibrium. Thus, the shaft angle follows the input voltage, and the shaft is proportional to the input signal.

It is evident that voltage at 80 and 91 must always be 180° out of phase if the conditions of equilibrium at point 81 is to be met. The generator 85 induces a generated voltage in winding 86 which has impedance 93 as a load. The generator voltage on conductor 94 is proportional to the rate at which the generator is turning and is zero for the stationary condition. The purpose of the generator voltage is to damp the system and prevent hunting about the balanced point for any particular value of input voltage at terminal 80. The phase of voltage 94 is always such as to oppose the motion of the shaft. The impedance 93 is tapped so as to act as a voltage divider and phase correcting load on the generator. The values of resistors 95 and 96 are determined by the scaling of the system. The voltage feed back on conductor 92 is analogous to the computed value resulting from the input voltages. The output terminal $E_0$ may be utilized for transferring the voltage analog to other places in the flight computer in dependence on the simulation equations.

FIG. 4 is a schematic of the electro-mechanical integrator or velocity servo commonly used for flight simulator computation. The input is connected at terminal 101 which in turn is attached to impedance 102. The motor amplifier 82 output is connected to winding 84 of motor 83. The motor shaft is connected to generator 85 which has output winding 86. Impedance 105 is connected to the generator winding 86. The generator winding 86 output voltage is connected through conductor 94 to input impedance 103. FIG. 4 is a functional schematic diagram of a typical electro-mechanical velocity servo. Whereas the apparatus shown in FIG. 3 servos itself to a position in accordance with the voltage applied at terminal 80, the apparatus of FIG. 4 rotates at a speed proportional to the input at terminal 101. By definition an integrator produces a shaft rotation whose rate is proportional to voltage input. It is convenient to use several elements of a servo to produce this result. The integration is accomplished by driving the shaft 88 at an angular velocity proportional to the input voltage 101. It can be seen from FIG. 4 that an integrator is similar to a servo without an answering potentiometer. Therefore, the shaft will continue to rotate since there is no voltage fed back to restore the equilibrium condition of zero voltage input. In the particular application the rate of shaft rotation for a certain value of voltage at 101 is determined by resistors 102 and 103 and the gear ratio between the motor generator set and the shaft 88 where the angle measured is to be shown. If the phase of voltage applied to terminal 101 is fixed the direction of shaft rotation is determined by the motor connections. Resistor 105 is used as a phase correcting load on the generator.

In FIG. 6, the conductors 52 and 54 are connected to the junctions 124 and 125 between rectifiers 120, 121, 122 and 123. Output leads 126 and 127 attach to impedances 61 and 62. As seen from FIG. 2 and FIG. 6, the voltage applied to potentiometers 42 and 44 is of a positive phase. The amplitude appearing on conductors 52 and 54 however is dependent upon the force exerted on the respective brake pedals by the pilot and co-pilot. Assume that 50 volts A.C. is present at the terminals of the potentiometers 42 and 44. Now, if the pilot should depress his right brake pedal 37 half-way, a voltage of 25 volts would appear on conductor 52 and at junction 125 of selector 47 as shown in FIG. 6. If the co-pilot should depress his right brake pedal 39 four-tenths of the way, a voltage 0.4 times 50 or 20 volts would appear on conductor 54 and at junction 125. On the positive half cycle of the A.C. waves, 25 volts would conduct from junction 124 through rectifier 121 toward connector 126. At the same time 20 volts would try to conduct from junction 125 through rectifier 123 but since the voltage at conductor 126 is 25 volts from the higher signal, rectifier 123 will not conduct, the only voltage getting to impedance 61 is the 25 volt signal or the greater of the two, and the magnitude selector has accomplished its selection for the positive half cycle of operation. The same selection takes place in the opposite direction with rectifiers 120 and 122 and the greater of the two negative half signals is applied to impedance 62. Similarly the left brake voltages are applied through conductors 51 and 53 to diode selector 49, the larger of these two voltages being applied to input resistors 63 and 64. It should be noted that the right braking signal is opposite in phase to the left braking signal therefore when the pilot or co-pilot is applying equal deflections to right and left pedal the signals concel and no turning moment due to brakes is evidenced at the output of the amplifier 110.

A detailed description of the operation of the nose wheel steering system will be made by references to FIG. 2. All of the force voltage analogs from the nose wheel on the ground are summed in amplifier 110. Braking voltages from the co-pilot's and pilot's right brakes are applied to the diode magnitude selector 47, the larger of the two voltages being applied to input resistors 61 and 62 due to the action of the selector 47. Braking voltages from the pilot's and co-pilot's left brakes are applied to the diode magnitude selector 49, the larger of the two voltages being applied to input resistors 63 and 64 due to the action of the selector 49. In addition to braking force the airplane turning moment ($M_z$) nose wheel hydraulic force and the castoring restoring force are applied to the input to amplifier 110. The castoring force is proportional to nose wheel angular position from neutral. A voltage proportional to the nose wheel position is therefore taken from potentiometer 32 on the mechanical shaft 3. This voltage may be used as one of the terms important in calculating the quantity turning rate ($W_z$) which is often used in flight simulation computation to drive rate of turn instruments and to be used as the signal to be integrated into heading angle information. This voltage is then multiplied by a function of Mach or aircraft forward velocity by potentiometer 34 when the nose wheel on ground relay 18 is energized. The output of the summing amplifier 110 which is the result of the four forces of braking, hydraulic turning and castoring is applied to the ends and center of potentiometer 35 on differential output shaft 4. Tap points close to the center of the potentiometer on each side of center are grounded. During castoring this potentiometer wiper arm is always in the center, so all of the summing amplifier output is transmitted through the potentiometer to the phase selector 48 through impedances 75 and 77 to the clutch demodulator 11. The clutch demodulator 11 operates to rectify the A.C. voltage inputs into a D.C. voltage for activation of the magnetic clutch 12. During this time the cam switches 73 and 74 do not energize relays 71 and 72 thus no input is conducted through potentiometer 33 to the summing amplifier input. Relay 71 is energized when nose wheel steering control is left of center and relay 72 is energized when the nose wheel steering control is right of center; center being the control wheel position which produces no deflection of the difference shaft 4.

When the student pilot moves the steering wheel 2 the differential output shaft 4 is held in neutral (as long as the airplane is moving) until the pilot overcomes the force of the centering spring 6 at which time the shaft 4 moves and closes relay 71 or relay 72 putting either a plus or a minus voltage on potentiometer 33. The arm of potentiometer 33 is positioned by an electro-mechanical computer such as shown in FIG. 3 or FIG. 4. The inputs to such a shaft would be analogous to hydraulic pressure quantity. If the pilot has hydraulic pressure and the landing gear is in the down position an input is applied to the amplifier 110 through the potentiometer 33. This input appears at potentiometer 35 along with any of the other force analogs which may be present. The cams 73 and 74 are set to close very near the grounded tap points on potentiometer 35. This allows additional effort at the steering wheel to cause a proportional increase in voltage to appear at the input to the clutch demodulator 11. This variable rate simulates the action of the metering valve in the real airplane. A maximum nose wheel movement rate is also simulated by choosing the correct scaling value for the end points of potentiometer 35.

In the actual aircraft the hydraulic system is powerful enough to overcome all other forces on the nose wheel, if full hydraulic pressure is available. To simulate this a magnitude selector 48 is included to rule out any input which might oppose the input through potentiometer 33. Therefore, whenever there is sufficient steering wheel deflection to close either relay 71 or 72 phase selector 48 is put into operation. At other times it is inoperative and input signals are essentially uneffected by the diodes. The diodes 46 and impedance 76 are provided merely to balance the effects of the plus or minus voltage from selector 48 diodes, as the A.C. voltages pass through zero potential. These of course would not be needed if a D.C. system were used.

When the nose wheel lifts off the ground the castoring restoring force analog voltage is removed from the input and a centering cam restoring force voltage analog 19 is applied directly to the clutch demodulator input. This is accomplished by operation of relay 13 and the relay terminals connected thereto. This centering cam restoring force voltage returns the nose wheel omega to center rapidly and holds it there. One additional potentiometer 30 is mounted on omega shaft for the purpose of limiting the movement of the shaft thereby simulating mechanical stops. It provides a restoring voltage to the input of the clutch demodulator by means of connector 15 and impedance 16.

From the above description it is seen that potentiometers 33 and 34 and the voltage due to turning moment $M_z$ are effects of their simulation means. The source of voltage or mechanical position for the three values hydraulic pressure, Mach and turning moment are developed in electro-mechanical computers similar to those shown in FIG. 3 and FIG. 4. The dotted lines for potentiometers 33 and 34 indicate mechanical shafts 88 as shown in FIG. 3 and FIG. 4. The position of the arm on the potentiometer indicates a degree of hydraulic pressure and the indicated Mach in terms of voltage analogs.

From the above it is seen that the apparatus of this invention provides for the simulation of a nose wheel steering system to a degree hitherto unknown and accurately computes the angular position of the nose wheel of an aircraft when taxiing, and imparts to the simulated nose wheel steering wheel those forces which would be imparted to an actual steering wheel in an aircraft.

It should be understood that this invention is not limited to specific details of construction and arrangement thereof herein illustrated, and that changes and modifications may occur to one skilled in the art without departing from the spirit of the invention.

What is claimed is:

1. In an aircraft trainer, a nose wheel control member, a nose wheel position shaft, motive means for said shaft, differential means having two input means responsive to the mechanical position of the said control member and position shaft, respectively, and one output means operable in accordance with the position difference between the two input means, potential means operative in accordance with the movement of the differential output means, and combining means interconnecting the said potential means and the said position shaft motive means so as to activate the said motive means in accordance with the said potential means.

2. In an aircraft trainer, a nose wheel control member, a nose wheel position shaft, motive means for said shaft, differential means having two input means responsive to the mechanical position of the said control member and position shaft, respectively, and one output means operable in accordance with the position difference between the two input means, potential means operative in accordance with the movement of the differential output means, braking potential means operative in response to the activation of simulated brakes in the aircraft trainer, combining means for algebraically summing the differential output potential and the braking potential, and means interconnecting the combining means and the position shaft motive means so as to activate the said motive means in accordance with the sum of the aforementioned potentials.

3. In an aircraft trainer, a nose wheel control member, a nose wheel position shaft, motive means for said shaft, differential means having two input means responsive to the mechanical position of the said control member and position shaft, respectively, and one output means operable in accordance with the position difference between the two input means, a first potential means operative in accordance with the movement of the differential output means and analogous to the hydraulic forces acting on a nose wheel, second potential means whose value is analogous to the turning moment forces acting to cause movement of a nose wheel, combining means for algebraically summing the output of said first and second potential means, and means interconnecting the combining means and the position shaft motive means so as to activate the said motive means in accordance with the sum of the output of the said first and second potential means.

4. In an aircraft trainer, a nose wheel control member, a nose wheel position shaft, motive means for said shaft, differential means having two input means responsive to the mechanical position of the said control member and position shaft, respectively, and one output means operable in accordance with the position difference between the two input means, a differential potential whose magnitude varies in dependence on the movement of the differential output means, a castoring potential whose magnitude varies in dependence with the nose wheel position shaft, combining means for algebraically summing the said differential potential and castoring potential, and means interconnecting the combining means and the position shaft motive means so as to activate the said motive means in accordance with the sum of the said potentials.

5. In an aircraft trainer, a nose wheel control member, a nose wheel position shaft, motive means for said shaft, differential means having two input means responsive to the mechanical position of the said control member and position shaft, respectively, and one output means operable in accordance with the position difference between the two input means, a first potential means operable in accordance with the output means of the differential means, differential braking means, a second potential means operative in accordance with said differential braking means, a third potential means operative in accordance with the aircraft trainer turning moment forces, a fourth potential means operative in accordance with the nose wheel position shaft, simulated flight velocity means for varying the fourth potential in accordance with the castoring force which would be applied to the nose wheel under actual aircraft operation, combining means for algebraically summing the potential outputs of the said first, second, third and fourth potential means, and means interconnecting the combining means and the position shaft motive means so as to activate the said motive means in accordance with the sum of the said first, second, third and fourth potentials.

6. In a grounded aircraft trainer means for simulating nose wheel steering comprising steering wheel position means, a nose wheel position shaft having motive means contained therein comprising rectifying means, motor means, tachometer means, means interconnecting the motor means with the nose wheel position shaft and means interconnecting the tachometer means with the rectifying means, means interconnecting the simulated nose wheel steering wheel with the differential means, means interconnecting the nose wheel position shaft with the differential means and means interconnecting the differential means with the motive means of the nose wheel position shaft for activating said motive means.

7. In a training device the combination comprising a simulated nose wheel steering wheel, a nose wheel position shaft, differential means, means interconnecting the simulated steering wheel with the differential means, means interconnecting the wheel position shaft with the differential means and means interconnecting the differential means output with the nose wheel position shaft for modifying the position of the nose wheel position shaft.

8. In a grounded aircraft trainer means for simulating nose wheel steering comprising steering wheel position means, nose wheel position means including motive means for said shaft, differential means responsive to a mechanical differential connected to the steering wheel position means and nose wheel position means, electrical simulated aircraft braking means comprising a left and right simulated brake pedal, potentiometers having arm elements connected so as to move in relation to the potentiometers in accordance with the simulated brake pedal position, potential means connected to the simulated brake potentiometers, electrical castoring restoring force means, electrical turning moment means, summation means having input and output connections, electrical connection means interconnecting the aforesaid electrical means with the input connections of the summation means and electrical means interconnecting the output connection of the summation means with the motive means of the nose wheel position means so as to alter the position of the nose wheel position means in accordance with summation means output.

9. In a training device for pilots having a computer for hydraulic pressure, Mach and turning moment, flight simulating apparatus for representing the ground travel condition of an aircraft of the type having three load bearing wheels arranged in a triangle wherein the forward wheel is turnable on an axis to steer the aircraft comprising in combination simulated aircraft controls including a steering wheel member, electromagnetic position means representative of the simulated nose wheel angular position, differential means connected to the two prior mentioned means, output differential means whose position is the difference between the positions of the steering wheel member and the electromagnetic position means, a first electronic means responsive to the position of the output differential means for generating a potential analogous to the hydraulic force available in a simulated aircraft and regulated by the hydraulic pressure computer, a second electronic means responsive to activation of simulated aircraft brake controls for generating a potential analogous to the differential braking force resulting in an actual aircraft from similar operation of the brake controls, a third electronic means responsive to the turning moment computer for generating a potential analogous to the turning moment force which would act upon an actual aircraft under the same operating conditions as present within the simulator, a fourth electronic means responsive to the position of the electromagnetic position means and the Mach computer for generating a potential analogous to the castoring restoring force which would be present on the nose wheel of an actual aircraft under similar circumstances, summing means having an output connection for adding algebraically the potentials generated by the first, second, third and fourth electronic means, means for modifying the output of the summing means in accordance with the position of the output differential means to produce a potential analogous to the combined hydraulic, differential braking, turning moment and castoring restoring forces, means connecting the last named potential to the electromagnetic position means for activating said electromagnetic position means to move to a position representing the position to which an actual nose wheel would move if subjected to the forces simulated and at the same time drive through the differential means to turn the steering wheel member as it would be turned in on aircraft when the aforementioned forces are present at the nose wheel.

10. Flight simulating apparatus for representing the ground travel conditions of an aircraft of the type having three load bearing wheels arranged in a triangle wherein the forward wheel is turnable on an axis to steer the aircraft comprising in combination simulated aircraft controls including a steering wheel and brakes for manipulation by a trainee, a computing system responsive to displacement of the steering wheel and actuation of the brakes to derive a resultant voltage, driving means connected to said system, and a member turnable by said driving means to a position corresponding to the resultant displacement of the simulated forward wheel.

11. The invention as set forth in claim 10 including means operated by said member and connected to the said driving means to derive voltages proportional to the displacement of the member and simulating mechanical stop and centering restoring force respectively.

12. In an aircraft trainer of the type having simulated controls and a computer for hydraulic pressure and Mach, a flight simulating apparatus for representing ground travel of a steerable aircraft comprising in combination a simulated steering wheel, a differential having two input shafts, the first input shaft connected to the steering wheel and the second input shaft representing the instantaneous position of the aircraft's nose wheel, means responsive to actuation of simulated brake controls for deriving a voltage representing differential braking force, driving means connected to the said second input shaft, electronic summing means connected to said driving means, means to derive a voltage representing the product of instantaneous nose wheel position and Mach, circuit means interconnecting said last recited means and said brake control deriving means with the said summing means to drive the second input shaft in accordance with the algebraic sum of the simulated forces applied to the nose wheel.

13. The invention as set forth in claim 12 wherein the said differential includes an output shaft, and means to bias the said output shaft to a neutral position so that motion of the second input shaft will tend to turn the simulated steering wheel.

14. The invention as set forth in claim 13 including means connected to the second input shaft to derive voltage simulating mechanical stop and centering restoring force, and a circuit interconnecting the said last named means with the said driving means.

15. The invention as set forth in claim 14 including a relay responsive to simulated ground travel condition to disable the said centering restoring force means and responsive to simulated flight condition to disable the said nose wheel position product deriving means.

16. The invention as set forth in claim 14 including means connected to be energized in response to the movement of said output shaft to derive a voltage representing magnitude of hydraulic pressure, and a circuit to interconnect said last named means to the summing means.

References Cited in the file of this patent

UNITED STATES PATENTS

| 2,631,795 | Schultz | Mar. 17, 1953 |
| 2,731,737 | Stern | Jan. 24, 1956 |